US012703097B2

(12) United States Patent
Mellander et al.

(10) Patent No.: US 12,703,097 B2
(45) Date of Patent: Aug. 11, 2026

(54) PROVIDING SAFETY IN A ROBOT SYSTEM

(71) Applicant: ABB Schweiz AG, Baden (CH)

(72) Inventors: Roger Mellander, Västerås (SE); Per Carlsson, Västerås (SE)

(73) Assignee: ABB Schweiz AG, Baden (CH)

( * ) Notice: Subject to any disclaimer, the term of this patent is extended or adjusted under 35 U.S.C. 154(b) by 74 days.

(21) Appl. No.: 18/570,932

(22) PCT Filed: Jun. 17, 2021

(86) PCT No.: PCT/EP2021/066492
§ 371 (c)(1),
(2) Date: Dec. 15, 2023

(87) PCT Pub. No.: WO2022/262986
PCT Pub. Date: Dec. 22, 2022

(65) Prior Publication Data

US 2024/0286287 A1 Aug. 29, 2024

(51) Int. Cl.
*B25J 9/16* (2006.01)

(52) U.S. Cl.
CPC ........... *B25J 9/1674* (2013.01); *B25J 9/1689* (2013.01); *G05B 2219/39448* (2013.01); *G05B 2219/40306* (2013.01); *G05B 2219/40399* (2013.01)

(58) Field of Classification Search
CPC .................. B25J 9/1674; B25J 9/1689; G05B 2219/39448; G05B 2219/40306; G05B 2219/40399
See application file for complete search history.

(56) References Cited

U.S. PATENT DOCUMENTS 6,560,513 B2 5/2003 Krause et al.
8,005,572 B2 * 8/2011 Evans .................... B25J 9/1656 318/568.22

(Continued)

FOREIGN PATENT DOCUMENTS

CN 101945740 A 1/2011
CN 104608127 A 5/2015

(Continued)

OTHER PUBLICATIONS

International Search Report and Written Opinion of the International Searching Authority; Application No. PCT/EP2021/066492; Completed: Mar. 2, 2022; Mailing Date: Mar. 14, 2022; 16 Pages.

(Continued)

*Primary Examiner* — Dale Moyer
(74) *Attorney, Agent, or Firm* — Whitmyer IP Group LLC

(57) ABSTRACT

A robot system includes a first group of robot controllers, each including a safety change control unit and each being connected to at least one corresponding manipulator, where one robot controller is a proxy robot controller. The safety change control unit of the proxy receives a request to manually operate at least one joint of at least one of the manipulators via a first point of manual control at one of the robot controllers and forwards it to the others, each safety change control unit determines a response to the request and at least one safety change control unit receives the responses from the other safety change control units, investigates if the responses and request match and denies the request in case at least one response does not match the request.

18 Claims, 4 Drawing Sheets

(56) References Cited

U.S. PATENT DOCUMENTS

| | | | |
|---|---|---|---|
| 2016/0046023 A1 | 2/2016 | Nagendran et al. | |
| 2016/0325435 A1* | 11/2016 | Svensson Landin | ... H04L 63/10 |
| 2017/0144297 A1 | 5/2017 | Takaichi et al. | |
| 2019/0121335 A1* | 4/2019 | Yoneda | .............. G05B 19/0405 |

FOREIGN PATENT DOCUMENTS

| | | | |
|---|---|---|---|
| CN | 112008690 | A | 12/2020 |
| EP | 3483684 | A2 | 5/2019 |
| EP | 3483684 | A3 | 9/2019 |
| JP | 5746879 | B2 | 7/2015 |
| WO | 2014127822 | A1 | 8/2014 |

OTHER PUBLICATIONS

European Office Action; Application No. 21 735 218.6; Issued: Apr. 29, 2025; 4 Pages.
International Preliminary Report on Patentability; Application No. PCT/EP2021/066492; Issued: Dec. 14, 2023; 10 Pages.
Chinese Office Action, Application No. 2021800992058; Completed: Mar. 11, 2026; Issued: Mar. 14, 2026; 16 Pages.

* cited by examiner 10
26
SCCUn 64
SCFGn 66
28
20
SCCU3 60
SCFG3 62
24
22
16
SCCU2 56
SCFG2 58
18
12
SCCU1 55
SCFG1 36
14
MPC1
40
SIU 54

PROVIDING SAFETY IN A ROBOT SYSTEM

TECHNICAL FIELD

The present invention relates to the field of robots. The invention more particularly relates to a robot system as well as to a method, robot controller, computer program and computer program product for providing safety in the robot system.

BACKGROUND

Robot systems can include a number of robots, each being implemented as a robot controller connected to at least one manipulator.

A robot controller typically runs software which causes a manipulator to move along a robot movement path. However, at times it is of interest for an operator to manually control a manipulator, for instance in order to make the manipulator move along a new or revised robot movement path. For this reason, a manual operating device, such as a teach pendant, may be connected to the robot controller.

The use of manual operating devices is for instance known from U.S. Pat. No. 6,560,513 B1.

US 2019/0121335 A1 discloses a computer system where a manual operating device is connected to a robot controller and used to command driving devices, such as robots. According to the document a robot controller can also change the operation of a target such as a robot, in case of risk of collision.

It is in many instances necessary to have a single point of control for such manual operation in a robot system and it is in this case also important that the safety is high.

The present invention is concerned with the provision of safety when there is a single point of manual control for a group of robot controllers in a robot system comprising several robots.

SUMMARY

The present invention is therefore directed towards providing safety in a robot system comprising several robots when there is single point of manual control.

This object is according to a first aspect achieved through a method for providing safety in a robot system comprising a first group of robot controllers, each robot controller comprising a safety change control unit and being connected to at least one corresponding manipulator, where one of the robot controllers is a proxy robot controller responsible for handling safety in relation to manual control of the manipulators, the method comprising the steps of: receiving, by the safety change control unit of the proxy robot controller, a request to manually operate at least one first joint of at least one first manipulator via a first point of manual control at one of the robot controllers, forwarding, by the safety change control unit of the proxy robot controller, the request to the safety change control units of the other robot controllers determining, in each safety change control unit, a response to the request, receiving, by the safety change control unit of at least one robot controller acting as a coherence investigating robot controller, the determined responses to the request from to the safety change control units of the other robot controllers, investigating, in the safety change control unit of the coherence investigating robot controller, if the responses and the request match, and denying, by the safety change control unit of the coherence investigating robot controller, the request in case at least one response does not match the request.

The object is according to a second aspect achieved through a robot system comprising a first group of robot controllers, each robot controller comprising a safety change control unit and being connected to at least one corresponding manipulator, where one of the robot controllers is a proxy robot controller responsible for handling safety in relation to manual control of the manipulators, the safety change control unit of the proxy robot controller being configured to receive a request to manually operate at least one first joint of at least one first manipulator via a first point of manual control at one of the robot controllers and forward the request to the safety change control units of the other robot controllers, each safety change control unit being configured to determine a response to the request, and the safety change control unit of at least one robot controller acting as a coherence investigating robot controller being configured to receive the determined responses to the request from the safety change control units of the other robot controllers, investigate if the responses and request match and deny the request in case at least one response does not match the request.

The object is according to a third aspect achieved by a robot controller for providing safety in a robot system comprising a first group of robot controllers, each robot controller being provided for connection to at least one corresponding manipulator, the robot controller comprising a safety change control unit configured to: obtain a request to manually operate at least one first joint of at least one first manipulator via a first point of manual control at one of the robot controllers, determine a response to the request, receive responses to the request determined by the safety change control units of the other robot controllers, investigate if the responses and request match, and deny the request in case at least one response does not match the request.

The first point of manual control may be a point to which a first manual operating device is connected or connectable for performing the manual operation.

The request, which may correspond to an operator manipulator selection of the at least one first joint, may additionally originate in a manual control configuration device, which may be the first manual operating device. However, the manual control configuration device where the request originates may also be another device such as an operator terminal in the robot system.

A manual operating device is a device for manual operation like manual control of at least one manipulator. Such a manual operating device may also be a portable manual operating device like a teach pendant.

In case the robot controller of the third aspect is a proxy robot controller responsible for handling safety in relation to manual control of the manipulators, the obtaining of the request comprises receiving the request from the manual control configuration device and the safety change control unit may be further configured to forward the request to the safety change control units of the other robot controllers.

The above-mentioned object is according to a fourth aspect achieved through a computer program for providing safety in a robot system comprising a first group of robot controllers, each robot controller being provided for connection to at least one corresponding manipulator, the computer program comprising computer program code which when run by a processor of a robot controller, implements a safety change control unit configured to: obtain a request to manually operate at least one first joint of at least one first manipulator via a first point of manual control at one of the robot controllers, determine a response to the request, receive responses to the request determined by the safety change control units of the other robot controllers, investigate if the responses and request match, and deny the request in case at least one response does not match the request.

The object is according to a fifth aspect achieved through a computer program product for providing safety in a robot system, the computer program product comprising a data carrier with the computer program code according to the fourth aspect.

The point of connection of the first manual operating device to one of the robot controllers in the first group may thus be a first point of manual control for the first group of robot controllers. This point is also a single point of manual control for the at least one first joint.

A coherence investigating robot controller is a robot controller that investigates the coherence of the responses to the request. It investigates if the responses are aligned with each other. Each robot controller may be a coherence investigating robot controller. Therefore, the investigating of if the responses and the request match may be made in all safety change control units of the robot controllers.

In one variation of the first aspect, the method may in this case comprises distributing, by each safety change control unit, the determined response to the safety change control units of the other robot controllers.

In a corresponding variation of the second aspect, each safety change control unit may be configured to distribute the determined response to the safety change control units of the other robot controllers.

In a corresponding variation of the third aspect, the safety change control unit is configured to distribute the determined response to safety change control units of the other robot controllers.

In this case the denying of the request may be performed if at least one of the safety change control units finds that at least one response does not match the request. The investigating of if the responses and the request match may furthermore comprise investigating if the responses are responses to the same request.

Each robot controller additionally comprises a safety configuration, where the safety configurations in the different robot controllers may be identical.

The determining of a response to the request may in this case be based on settings regarding the at least one first manipulator in this safety configuration.

The response may thus be based on an investigation of a safety configuration in the robot controller. The safety change control unit of each robot controller may investigate a local safety configuration in the robot controller, possibly in relation to the information about which robot controller that provides the first point of manual control.

The investigation of the safety configuration may furthermore be an investigation of if the at least one first joint or the at least one first manipulator is allowed to be manually operated. A safety configuration may thus comprise a setting that manual operation is allowed or is not allowed. If manual operation is allowed, there may additionally be conditions under which it is allowed. The investigation may therefore additionally comprise an investigation of if there are manipulators related to the at least one first manipulator, which related manipulators have required or allowed operational states in order for the at least one first manipulator of the request to be allowed to be manually operated. The above-mentioned settings may additionally specify required or allowed operational states for joints of the related manipulators in relation to corresponding joints of the at least one first manipulator. It is also possible that the related manipulators differ depending on where the single point of control is provided. It is for instance possible that the related manipulators with required or allowed states are manipulators connected to the robot controller with the first point of manual control or manipulators close to the first point of manual control, such as between the manipulator allowed to be manually operated and the first point of manual control.

The response may therefore be based on the settings of allowable or required operational states of related manipulators in the safety configuration. It may additionally be based on the current operational states of these related manipulators. The response may more particularly be based on comparing the settings of allowable or required operational states defined in the safety configuration with the current operational states.

The at least one first joint may or may thus not be allowed to be used, which may be reflected in the response. A response where the at least one first joint is allowed to be used then matches the request, while a response where the at least one first joint is not allowed to be used does not match the request.

The settings may additionally comprise settings regarding how the robot system is to respond to the manual operation of the at least one first joint set out in the request. The safety change control unit of at least one robot controller may in this case also monitor that the robot system is operated according to the setting.

Furthermore, a safety change control unit that denies the request may further implement a protective stop for all of the manipulators.

As was mentioned earlier, the request may correspond to an operator manipulator selection of the at least one first joint. Each safety change control unit of each robot controller may furthermore conclude that there is a match if no safety change control unit finds that at least one response does not match the request and may thereafter lock the operator manipulator selection.

This means that the lock may be made if all safety change control units perform the investigation and find matches between all the responses and the request.

The safety change control unit of a robot controller may thus be configured to lock the operator manipulator selection if no safety change control unit has determined that at least one response does not match the request.

The locking may be followed by the safety change control unit of the proxy robot controller forwarding information about the request and all responses to the manual control configuration device and confirming the validity of the lock if receiving an acknowledgment in return, where manual operation of the at least one first joint is allowed after the validity of the lock has been confirmed.

The locking may be in effect until a request to cease manually operating the at least one first joint is received by the safety change control unit of the proxy robot controller. The request to cease manually operating the at least one first joint may be received from the first manual operating device or from the manual control configuration device.

As an alternative to being in effect until a request to cease manually operating the at least one first joint is received, the locking may be in effect until the system is powered off.

The manual operation of the at least one first joint is carried out in a manual mode. As yet another alternative the locking may be in effect until there is a mode change of the at least one first joint from the manual mode to an automatic mode.

The manual control configuration device may comprise a safety investigating unit for communicating with the safety change control unit of the proxy robot controller.

In this case the receiving of the request by the safety change control unit of the proxy robot controller may be from the safety investigating unit of the manual control configuration device. In a similar manner the forwarding of information about the request and all responses by the safety change control unit of the proxy robot controller may be made to the safety investigating unit of the manual control configuration device. The acknowledgment as well as the request to cease manually operating the at least one first joint may in this case also be received from the safety investigating unit.

It is additionally possible that more manual control is allowed among the manipulators connected to the first group of robot controllers.

The request may therefore be a request to manually operate at least one second joint of at least one second manipulator via a second point of manual control at another one of the robot controllers. The second point of manual control may thus be provided by another robot controller than the robot controller that provides the first point of manual control.

The present invention has many advantages. It allows selection and safe manual control of all or a subset of the robots. It provides scalability. It lowers the cost of the robot system associated with having more than one manual operating device. It provides ease of use through only having one connection point for the first manual operating device. The single connection point additionally allows the provision of a single point of control of one or several robots in the robot system.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
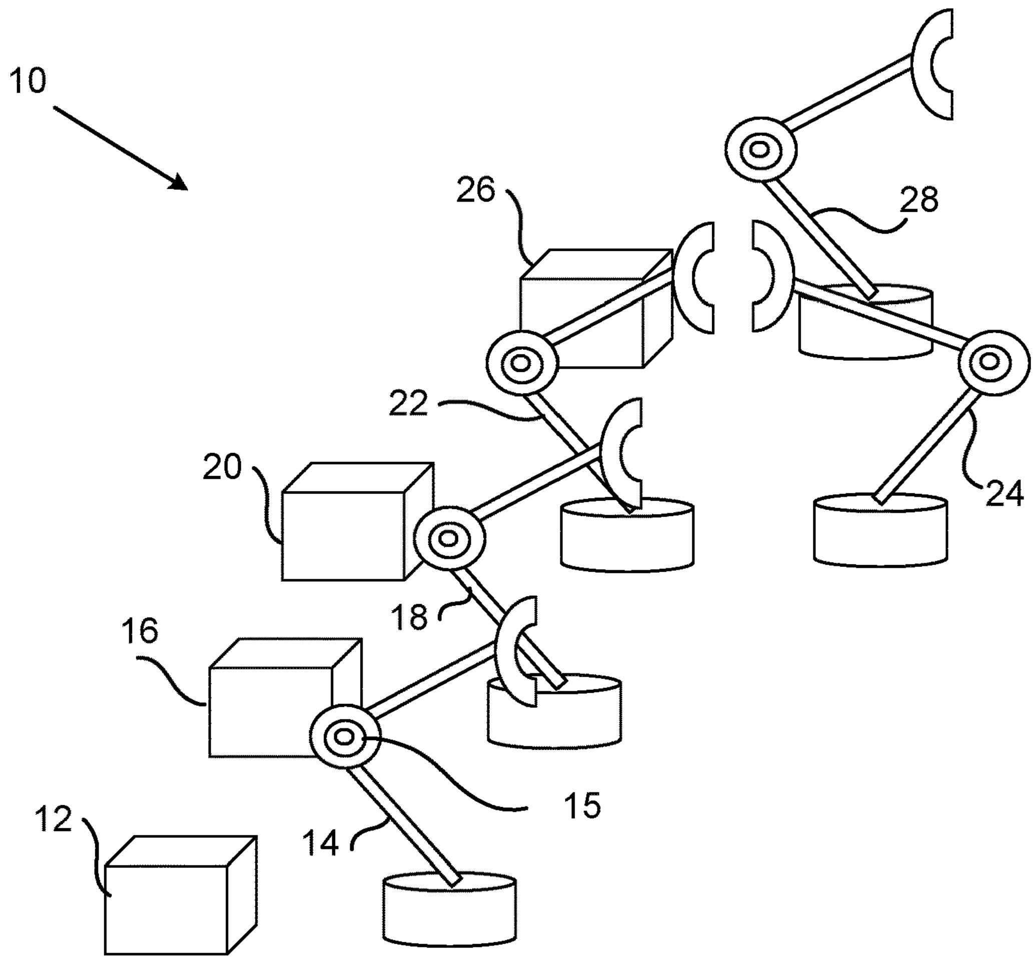
FIG. 1 schematically shows a robot system comprising a first group of robot controllers together with a number of manipulators, FIG. 2 schematically shows one realization of a first robot controller in the first group.

FIG. 1 schematically shows a robot system 10. The robot system 10 comprises n robots, where n≥2 and a robot is a combination of a robot controller with one or more manipulators. One robot controller may as an example be combined with up to four manipulators. In the present example there is a first robot formed through a first robot controller 12 and a first manipulator 14, a second robot formed through a second robot controller 16 and a second manipulator 18, a third robot formed through a third robot controller 20, a primary third manipulator 22 and a secondary third manipulator 24. Finally, there is an nth robot formed by an nth robot controller 26 and an nth manipulator 28. Each manipulator may comprise a number of joints, and a robot controller may control the movement of a manipulator through controlling its joints. In FIG. 1 one such joint 15 of the first manipulator 14 is indicated.

Figure 2:
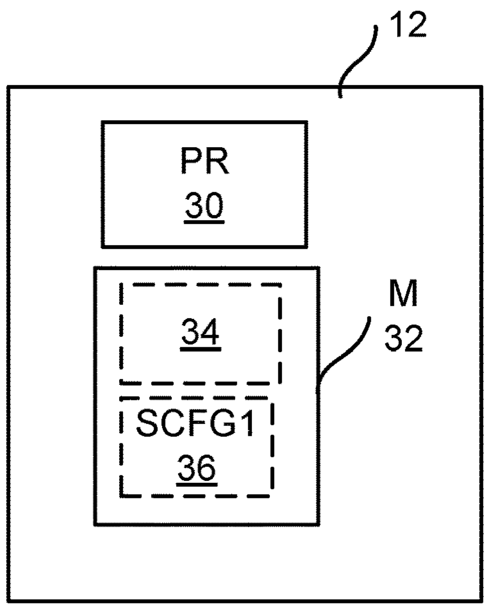

A robot controller comprises at least one memory with robot control software and a processor used to control the robot using the robot control software. FIG. 2 shows an example of such a processor PR 30 with program memory M 32 in the first robot controller 12.

According to aspects of the present disclosure, the memory 32 also comprises software or computer program code 34 for implementing a first safety change control unit SCCU1 and optionally also a first safety configuration SCFG1 36.

It should here be realized that the safety change control unit may as an alternative be realized as a separate piece of hardware, for instance as an Application-Specific Integrated Circuit (ASIC) or as Field-Programmable Gate Array (FPGA) or as a safety change control board comprising such a circuit.

As is also known, an operator may manually operate a robot using a so-called manual operating device, such as a Teach Pendant or a Robot Control Mate. Such a manual operating device is also often portable.

Figure 3:
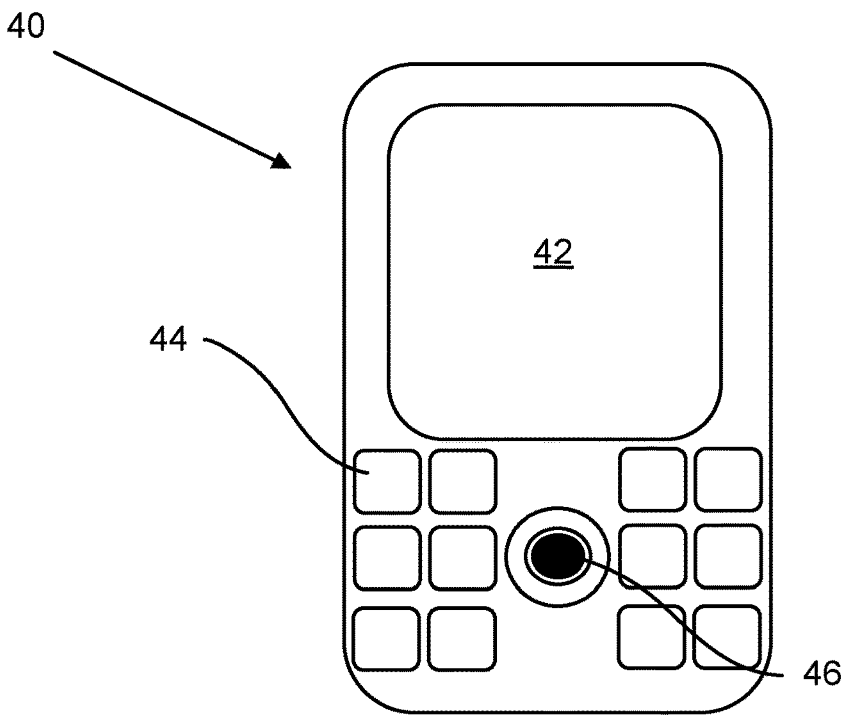
FIG. 3 shows a front view of a manual control configuration device, FIG. 4 schematically shows a number of elements in the manual control configuration device, FIG. 5 schematically shows communication between a first manual operating device and the first robot controller as well as between the robot controllers of the robot system.

FIG. 3 schematically shows a front view of a manual control configuration device, i.e. a device for configuration of manual control. The manual control configuration device is here provided in the form of a first manual operating device 40. The manual control configuration device comprises a display 42 and a number of user input units, such as keys or buttons 44 and a joystick 46. The keys 44 may be used to select between various options, which in case the manual control configuration device is a manual operating device may be options such as emergency stop, manual mode and automatic mode, while the joystick 46 may be used for controlling a manipulator in manual mode. In case the manual control configuration device is a manual operating device, it may also comprise a three-position enabling input unit (not shown). It is also possible to equip the device with an accelerometer for motion sensing as well as with a pointing unit, such as a pointing unit that is based on a camera, using light or radio-frequency identification (RFID).

Figure 4:
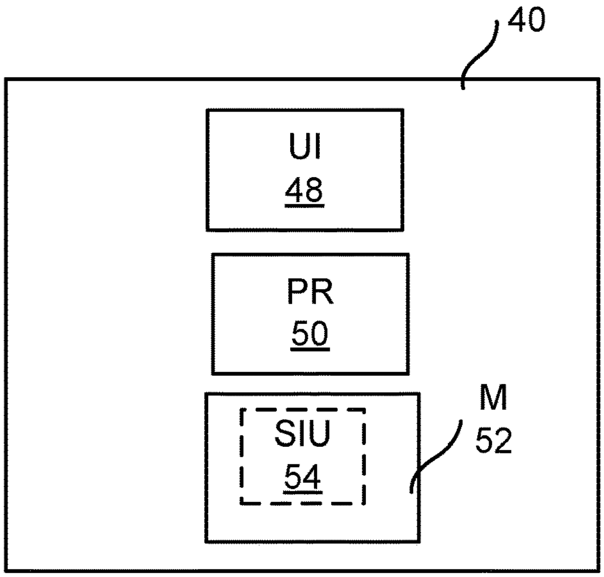

FIG. 4 schematically shows various components of the manual control configuration device realized as the first manual operating device 40. It comprises a processor PR 50 and a memory M 52 as well as a user interface UI 48 made up of the previously mentioned display 42, buttons 44, joystick 46 and three-position enabling unit as well as possibly also the accelerometer and/or pointing unit. The memory 52 furthermore comprises computer program code providing a safety investigating unit SIU 54.

Figure 5:
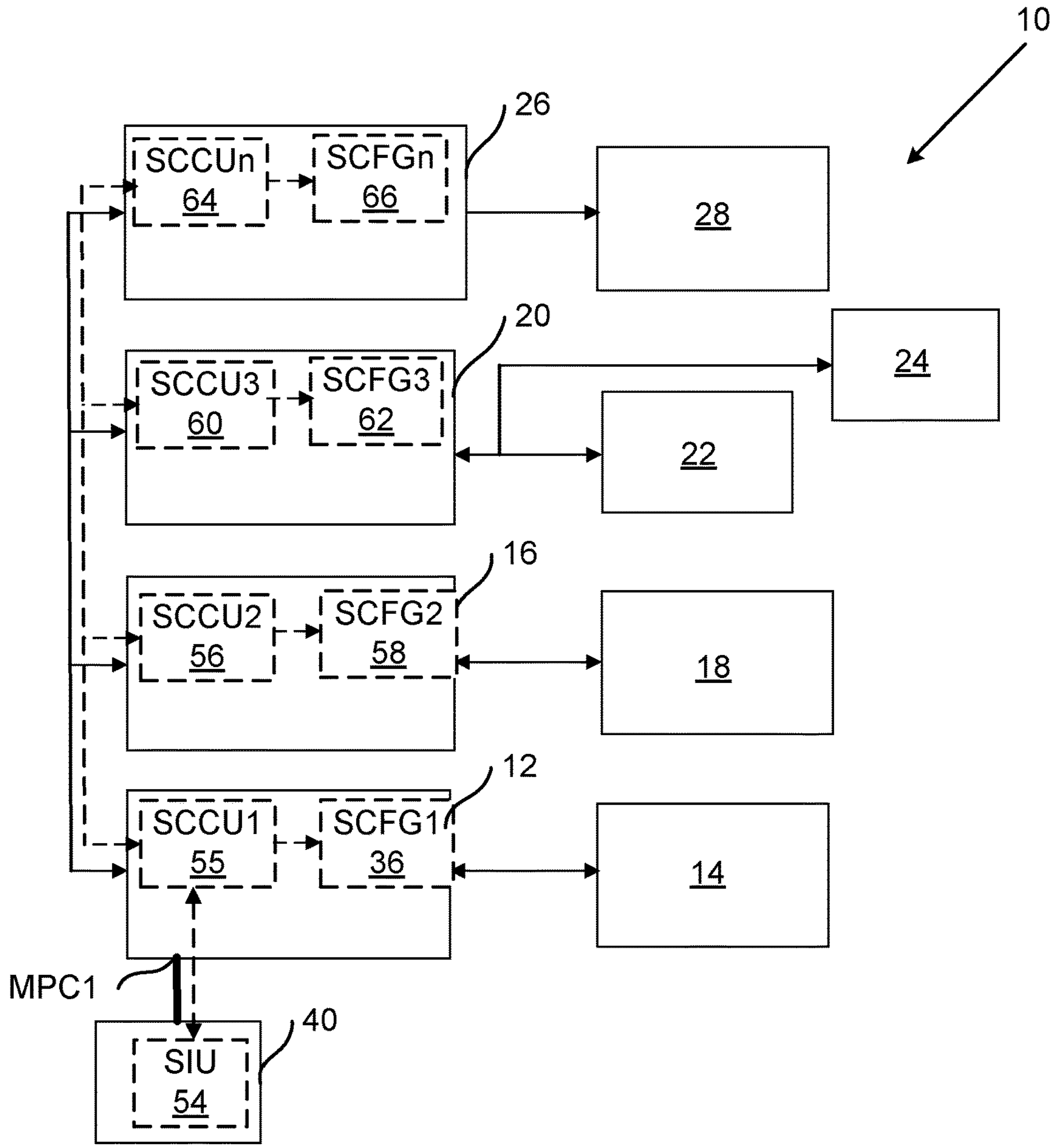

FIG. 5 schematically shows the robots of FIG. 1 with the first manual operating device 40 including the safety investigating unit 54. The robot controllers 12, 16, 20 and 26 each comprise safety change control units and safety configurations. The first robot controller 12 thereby comprises the first safety change control unit SCCU1 55 and the first safety configuration SCFG1 36, the second robot controller 16 comprises a second safety change control unit SCCU2 56 and a second safety configuration SCFG2 58, the third robot controller 20 comprises a third safety change control unit SCCU3 60 and a third safety configuration SCFG3 62 and the nth robot controller 26 comprises an nth safety change control unit SCCUn 64 and an nth safety configuration SCFGn 66.

The shown robot controllers 12, 16, 20 and 26 are all part of a first group of robot controllers and one of the robot controllers in the first group is connected to the first manual operating device 40. In the present example, this is the first robot controller 12. Thereby, the first manual operating device 40 is also connected to the first robot controller 12 and it is connected to the first robot controller 12 via a connection that may be wired, for instance via a cable. In other instances, the connection may be a wireless connection, such as a short-range wireless connection, for instance a Bluetooth or WiFi connection. This connection is the only connection of the first manual operating device 40 to the robot system 10. It is also possible that there are no other manual operating devices connected to the first group of robot controllers. As an alternative more manual operating devices may be connected to the first group of robot controllers. However, only one of them may be allowed to form a point of manual control for a certain joint of a certain manipulator in order to form a single point of manual control for this joint of this manipulator. However, it should be realized that this single point of manual control may be changed. It may also be possible to change the manual operating device via which manual control is carried out. The first manual operating device could also in some instances be connected to other robot controllers in the robot system 10 or another manual operating device connected to the first robot controller.

Each robot controller is also connected to the manipulators that it controls. The first robot controller 12 is connected to the first manipulator 14, the second robot controller 16 is connected to the second manipulator 18, the third robot controller 20 is connected to the primary and secondary third manipulators 22 and 24 and the nth robot controller 26 is connected to the nth manipulator 28.

The robot system thus comprises a first group of robot controllers and a number of manipulators, where each robot controller in the first group comprises a safety change control unit and is connected to at least one corresponding manipulator among the number of manipulators. It should be realized that in the robot system there may exist other groups of robot controllers connected to other manipulators, which may have different realizations.

The robot controllers of the first group are furthermore interconnected via a communication network, such as a star, daisy-chain, or ring network. In FIG. 5 there is control communication between the robot controllers as well as between robot controllers and manipulators. The control communication between the robot controllers is typically made using the communication network, while a robot controller may communicate with a manipulator via a dedicated direct communication link. This control communication is in FIG. 5 shown with solid arrows.

There is also safety communication that is carried out between the safety investigating unit 54 and the first safety change control unit 55 using the connection between the first manual operating device 40 and the first robot controller 12. There is also safety communication between the different safety change control units, which is carried out using the communication network, as well as the reading of safety configurations internally in the robot controllers by the safety change control units. This safety communication and reading of safety configurations is in FIG. 5 indicated with dashed arrows.

The robots in the robot system 10 are often operated automatically, such that a robot controller controls each manipulator connected to it to follow a robot movement path. However, at times it is of interest for an operator to operate one or more of the robots manually at a point of manual control using a manual operating device, such as operating one or more robots via a first point of manual control MPC1 using the first manual operating device 40. This could be necessary if an operator wants to change or update a robot movement path. It is important that this change to manual operation is done safely. Therefore, aspects of the present disclosure are directed towards implementing measures for safely introducing manual operation in the robot system 10 via such a first point of manual control.

When an operator wants to interact with robots in the robot system 10, it is not necessary that all robots need to be under the operator's control. Aspects of the present disclosure provide a solution on how to select and safely agree on which robots in the robot system that shall be under manual control and which robots shall not.

Figure 6:
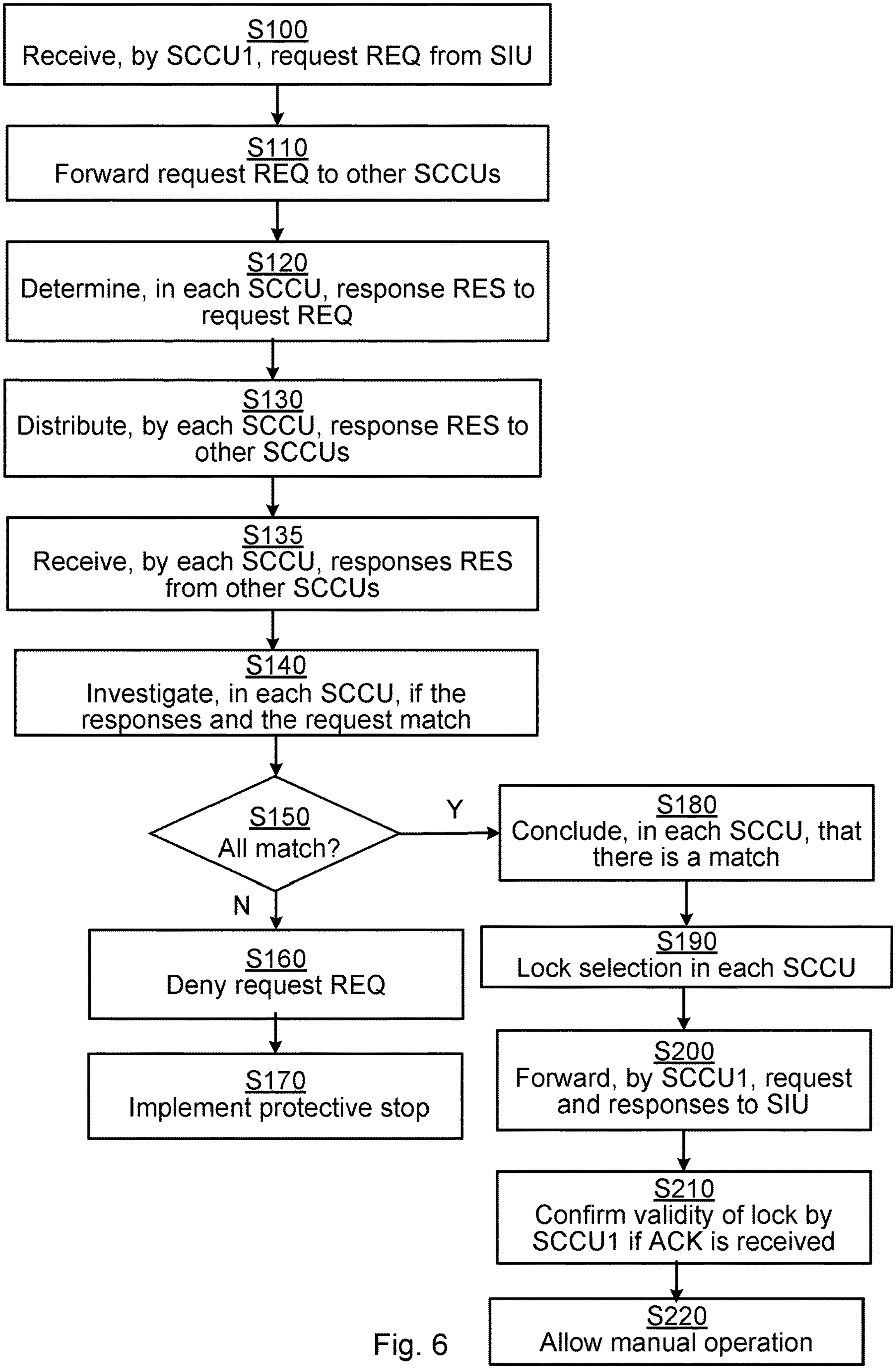
FIG. 6 shows a flow chart of a number of steps in a method of providing safety in the robot system, and FIG. 7 schematically shows a computer program product in the form of a CD ROM disc comprising computer program code for implementing a safety change control unit of a robot controller.

How this may be done will now be described with reference also being made to FIG. 6, which shows a flow chart of a number of method steps in a method of providing safety in the robot system 10.

As can be seen in FIG. 5, each robot controller comprises a safety change control unit and a safety configuration. The safety change control unit may be a part of the robot controller at delivery. However, the safety configuration is typically implemented afterwards. A safety configuration could be placed in a robot controller in different ways. It could be placed in the robot controller by an operator off-line before the robot controllers are connected to the communication network or it could be downloaded to the robot controllers on-line when they are connected to the communication network.

The safety configurations may more particularly be identical in the different robot controllers. The safety configurations may thus be the same and may as an example specify a first group of robot controllers in the robot system 10 that can be used in manual control of corresponding manipulators, which may be all or a subset of the robot controllers in the robot system. The first group of robot controllers may thus be all or a subset of robot controllers in the robot system. The safety configuration may then specify which robots in the first group that can be manually operated. For a manipulator allowed to be manually operated it may additionally identify a required or allowed state of one or more of the other manipulators, such as if the other manipulator also has to be manually operated at the same time, idle or disabled or if it can be in an automatic state in which it may run along a robot movement path. These other manipulators are thus manipulators that are related to the manipulator that is allowed to be manually operated. The safety configuration may additionally specify joints of the manipulator allowed to be manipulated and of the related manipulators for which these settings apply. It is additionally possible that the related manipulators differ depending on where the first point of manual control is provided. It is for instance possible that the related manipulators with required or allowed states are manipulators connected to the robot controller with the first point of manual control or manipulators close to the first point of manual control, such as between the manipulator allowed to be manually operated and the first point of manual control.

The safety configurations may additionally be the same in all robots. Each robot controller may thus have its own copy of a common safety configuration of all robot controllers in the group to which it belongs, and the manipulators connected to them. It is also possible that the authenticity of each copy is verified, for instance through being signed by a trusted entity.

It is additionally possible that the safety communication between the first manual operating device 40 and the first safety change control unit 55 and/or that the safety communication between the safety change control units 55, 56, 60 and 64 of the robot controllers 12, 16, 20 and 26 is encrypted.

As can be seen in FIG. 5, the first manual operating device 40 is connected to the first robot controller 12. According to aspects of the present disclosure, one robot controller in the first group is responsible for handling safety in relation to manual control of the manipulators connected to the first group of robot controllers. In an example presented here the first robot controller 12 has this responsibility. For this reason, the first robot controller 12 is also termed a proxy robot controller. It is also possible that another robot controller, such as the third robot controller 20, is a proxy robot controller instead.

The method starts when an operator of a manual control configuration device, such as an operator of the first manual operating device 40 or an operator at an operator terminal connected to the communication network, wants to allow manual operation of at least one first joint of at least one first manipulator via a first point of manual control MPC1. Thereby the first point of manual control is to be a single point of manual control for the at least one first joint of the at least one first manipulator. The first point of manual control may be a point of any robot controller in the first group to which a manual operating device may be connected. The at least one first manipulator may additionally be any manipulator among the manipulators connected to the first group of robot controllers. The operator thus selects at least one first joint of at least one first manipulator among the manipulators connected to the first group of robot controllers that he or she wants to allow manual operation of via a corresponding first point of manual control. In this example the first point of manual control MPC1 is the point of connection of the first manual operating device 40 to the first robot controller 12. In case the first manual operating device 40 is the manual control configuration device, the first point of manual control may additionally already be known or automatically selected.

This operator manipulator selection or desire to manually operate at least one first joint of at least one first manipulator among the number of manipulators via a first point of manual control MPC1 is detected by the safety investigating unit 54 of the manual control configuration device, for instance in the first manual operating device 40. The safety investigating unit 54 then sends a request REQ for manual control of the at least one first joint of the at least one first manipulator via the first point of manual control MPC1, which request REQ is sent to the first safety change control unit 55 in the first robot controller 12, where the request thus is a request to allow manual control to be made of at least one first joint of at least one first manipulator among the number of manipulators via the point of manual control.

The request may additionally be a request to allow manual operation of the at least one first joint of the at least one first manipulator via the first point of manual control using a manual operating device connectable to the first point of manual control, which in this case is the first manual operating device 40 that is connected to the first robot controller 12. The request that the first manual operating device is to be used via the first point of manual control may be automatic in case the request is sent from the first manual operating device 40.

Thereby the first safety change control unit 55 of the proxy robot controller receives the request REQ from the safety investigating unit 54 of the manual control configuration device, S100, where the request REQ corresponds to the operator manipulator selection and thereby identifies manipulators and perhaps joints of these manipulators that the operator wants to operate manually via the first point of manual control MPC1, which may be only one manipulator and even only one joint of a single manipulator.

The first safety change control unit 55 then forwards the request REQ to the safety change control units of the other robot controllers in the first group, S110. The first safety change control unit 55 thus forwards the request REQ to the second safety change control unit 56, the third safety change control unit 60 and the nth safety change control unit 64. It may also forward information about which robot controller that is the proxy robot controller implementing the first point of manual control.

The above-described forwarding is the forwarding carried out in a ring network. If the communication network is star or a daisy-chain network, an approach that is suitable for use in these types of networks would of course be used instead.

Thereafter each safety change control unit determines a response RES to the Request REQ, S120. The first safety change control unit 55, the second safety change control unit 56, the third safety change control unit 60 and the nth safety change control unit 64 thus each determines a response RES to the request, where the response may comprise a confirmation of which manipulators and possibly also their joints that the operator desires to manually operate via the first point of manual control MPC1, for instance using the first manual operating device 40. The response RES may also comprise an answer if the operator selected manipulators and/or joints are allowed to be operated from the first point of manual control MPC1. That the manipulators and/or joints are allowed to be operated may be determined through the safety change control unit investigating its local safety configuration, possibly in relation to information about at which robot controller the first point of manual control is provided. The response to the request may thereby also be based on investigating settings regarding the at least one first manipulator in the safety configuration, such as if the joint or manipulator is allowed to be manually operated or not from the first point of manual control. The response may additionally be based on an investigation of if there are manipulators related to the at least one first manipulator of the request. Which manipulator that is a related manipulator for the operator selected first manipulator may depend on the location of the first point of manual control. The related manipulators may additionally have required or allowed operational states in order for the at least one first manipulator of the request to be allowed to be manually operated. Examples of such required or allowed operational states are if the related manipulators have to be manually operated, idle or disabled at the same time as the operator selected first manipulator is manually operated via the first point of manual control or if they can be in an automatic mode. The above-mentioned investigation may additionally be an investigation into the required or allowed operational states for joints of the related manipulators in relation to corresponding joints of the at least one first manipulator of the request. Allowing of manual operation may thereby depend on the required and/or allowed operational states of the related manipulators.

The response may thus be based on if the at least one joint of the at least one manipulator is allowed to be manually operated or not and if it is, the response may additionally be based on the settings of allowable or required operational states of related manipulators in the safety configuration. It may additionally be based on the current operational states of these related manipulators and/or joints. The response may more particularly be based on comparing the settings of allowable or required operational states with the current operational states.

The determined responses are then sent to the safety change control unit of at least one coherence investigating robot controller of the first group, where a coherence investigating robot controller is a robot controller that investigates the coherence of the responses to the request. It investigates if the different responses are aligned with each other. It is possible that only one robot controller in the first group is such a coherence investigating robot controller. However, it is also possible that several robot controller act as coherence investigating robot controllers. In the present example each robot controller in the first group is a coherence investigating robot controller.

In this case, each safety change control unit distributes the response RES it has determined to the safety change control units of the other robot controllers in the first group, S130. The first safety change control unit 55 thus sends its determined response to the second, third and nth safety change control units 56, 60 and 64, the second safety change control unit 56 sends its determined response to the first, third and nth safety change control units 55, 60 and 64, the third safety change control unit 60 sends its determined response to the first, second and nth safety change control units 55, 56, and 64 and the nth safety change control unit 64 sends its determined response to the first, second and third safety change control units 55, 56 and 60.

The determined responses are then received by the safety change control units of each coherence investigating robot controller. As each robot controller is a coherence investigating robot controller in the present example, each safety change control unit receives the responses from the other safety change control units, S135.

The safety change control unit of each coherence investigating robot controller then investigates if the responses and the request match. In case there is only one coherence investigating robot controller, it is possible that only one safety change control unit investigates if the responses and request match. In this case it is additionally possible that the proxy robot controller acts as this coherence investigating robot controller. In the present example all robot controllers in the first group act as coherence investigating robot controllers. Therefore, each safety change control unit investigates if the responses and the request match, S140.

A match exists if all the responses are the same response to the same request. There is thus a match if the responses are concerned with manual operation of the same manipulators and possibly also their joints from the same point of manual control as in the original request and if the manual operation is allowed considering the settings in the safety configuration and possibly also considering the current operational states of the related manipulators.

If at least one safety change control unit finds that at least one response does not match the request, S150, this safety change control unit denies the request REQ, S160, which may involve disallowing manual operation of the manipulators of the request. The denying of the request is thus made if at least one of the safety change control units finds that at least one response does not match the request. The denial of the request may additionally be followed by implementing a protective stop in the robot system 10, S170. This protective stop may be implemented for all the robots. All manipulators connected to the robot controllers of the first group will thereby be stopped from moving.

However, if no safety change control unit finds a lack of a match, i.e. if all responses match the request, S150, each safety change control unit concludes that there is a match, S180. Thereby each robot controller also knows how to respond to commands input by an operator via the first point of manual control MPC1, for instance using the first manual operating device 40. Each safety change control unit then locks the selection, S190, i.e. it locks the operator selection of manipulator and/or joint. The lock is thus made if all safety change control units perform the investigation and find a match between all the responses and the request.

The first safety change control unit 55 of the proxy robot controller then forwards information about the request and all the responses to the safety investigating unit 54 of the manual control configuration device, S200, and thereafter awaits a reply.

The safety investigating unit 54 of the manual control configuration device then displays the received information on the display 42, It thus displays the request REQ along with the various responses and then awaits an acknowledgment from the operator, which acknowledgment may be input by the operator using one or more of the keys 44 and/or joystick 46. If the manual control configuration device is the first manual operation device equipped 40 with an accelerometer and/or a pointing unit, acknowledgement may be detected via the accelerometer or pointing unit, where a certain movement and/or orientation of the manual operation device or the pointing with the pointing unit at a certain spot or code, like a bar code, QR code or RFID code, corresponds to an acknowledgement. After having received it, the safety investigating unit 54 then sends the acknowledgement ACK to the first safety change control unit 55 in the proxy robot controller.

After having received the acknowledgement ACK, the first safety change control unit 55 confirms the validity of the lock, S210, whereupon manual control of the manipulators and joints defined in the request is allowed in the robot system by all safety change control units, S220. The lock is then kept until a deselection of the manual operation of the manipulators and joints in question is made, possibly combined with a new selection, and/or the robot system is powered off. The locking may thus be in effect until a request to cease manually operating the at least one first joint of the at least one first manipulator is received from the first manual operating device or manual control configuration device by the safety change control unit of the proxy robot controller. Alternatively, the locking may be lifted by the system being powered off.

As yet another alternative, the locking may be in effect until there is a mode change of the at least one joint of the at least one manipulator from the manual mode to the automatic mode. However, this alternative may be less attractive from a safety point-of-view.

The lock is thus a lock to the operator manipulator selection defined in the original request. An operator can thereby only manually operate the manipulators and possibly also the joints defined in the original request during the lock. This operation is furthermore only possible from one point of manual control, which in this case is the point where the first manual operating device is connected to the robot system, here the connection to the first robot controller.

When the operator manually operates the selected manipulator, the safety change control units may monitor the operation of related manipulators. As each robot controller of the first group comprises a safety configuration with settings regarding how the robot system is to respond to the manual operation of the selected manipulator, the safety change control unit of each robot controller that is connect to a related manipulator may monitor this manipulator concerning compliance with the settings and change the operation of this related manipulator in case it is necessary.

The way in which safety is provided has a number of advantages. It allows the connection and disconnection of a first manual operating device to and from an actual robot in the selection of robots and safe operation of all or a subset of the robots. It provides scalability e.g., addresses a robot or a combination of robots in the robot system, independently of the number of robots. It avoids the need for additional safety related hardware to select or deselect robots to be used under manual control. It lowers the cost of the robot system associated with having more than one manual operating device. It provides ease of use through only having one connection point for a manual operating device to safely control the selected robots in the robot system. The single connection point additionally provides a single point of control of one or several robots in the robot system.

If looking at the robot controllers independently from each other, it can be seen that the safety change control unit of a robot controller in the first group that acts as a coherence investigating robot controller obtains a request to manually operate at least one first joint of at least one first manipulator using the first manual operating device at a first point of manual control in the robot system, where the request originates in a manual control configuration device, such as the first manual operating device 40. The safety change control unit determines a response to the request and receives responses to the request determined by the safety change control units of the other robot controllers in the first group, investigates if the responses and request match and denies the request in case at least one response does not match the request.

In case there are more coherence investigating robot controllers, the above-mentioned safety change control unit additionally distributes the response it has determined to the safety change control units of the other coherence investigating robot controllers.

If no safety change control unit of any coherence investigating robot controller has determined that at least one response does not match the request, the operator manipulator selection may be locked by the safety change control units of all coherence investigating robot controllers.

If a robot controller is both a proxy robot controller and a coherence investigating robot controller, the safety change control unit of this robot controller additionally obtains the request through receiving it from the manual control configuration device, forwards the request to the safety change control units of the other robot controllers in the first group and in case of locking the operator manipulator selection also forwards information about the request and all responses to the manual control configuration device and confirms the validity of the lock if receiving an acknowledgment in return.

It is additionally possible that more manual operations devices are allowed for being used to control manipulators connected to robot controllers in the first group.

The request may for instance also be a request to manually operate at least one second joint of at least one second manipulator among the number of manipulators of the first group of robot controllers via a second point of manual control at another robot controller in the first group. The manual control via the second point of manual control may then be carried out using a second manual operating device connected or connectable to the other robot controller in the first group at the second point of manual control. It is as an example possible that the third robot controller provides a second point of manual control.

The request may therefore be a request for allowing the first manual operating device to operate at least one first joint of at least one first manipulator via a first point of manual control as well as a request for allowing a second manual operating device to operate at least one second joint of at least one second manipulator via a second point of manual control, where the first point of manual control may be provided at a robot controller in the first group to which the first manual operating device is connected or to be connected and the second point of manual control is provided at another robot controller in the first group to which the second manual operating device is connected or to be connected.

It should also be realized that it is possible for the request to also be a request for allowing even further manual operating devices to operate manipulators via further points of manual control.

Figure 7:
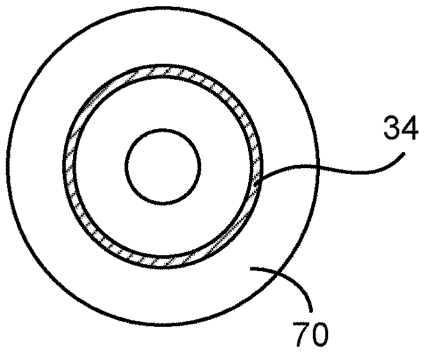

The safety change control unit was above-described as being provided through a processor together with computer program code in a memory implementing the safety change control unit when being run by the processor. As an alternative and as has also been previously mentioned, the safety change control unit may be provided in the form of an Application Specific Integrated Circuit (ASIC) or Field-Programmable Gate Array (FPGA). This computer program code may also be provided on one or more data carriers, such as memory sticks or CD ROM discs, which realizes the safety change control unit when the program code thereon is being loaded into the robot controller. One such data carrier 70 with computer program code 34, in the form of a CD ROM disc, is schematically shown in FIG. 7. The computer program product may as an alternative be provided on a server and downloaded therefrom into the processing entity in question. Here it should also be mentioned that it is additionally possible that the safety configuration is provided on the same data carrier or server.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore, the present invention is only to be limited by the following claims.

The invention claimed is:

1. A method for providing safety in a robot system, the robot system comprising a first group of robot controllers, each robot controller including a safety change control unit and being connected to at least one corresponding manipulator, where one of the robot controllers is a proxy robot controller responsible for handling safety in relation to manual control of the manipulators, the method comprising the steps of:

receiving, by the safety change control unit of the proxy robot controller, a request to manually operate at least one first joint of at least one first manipulator via a first point of manual control at one of the robot controllers, forwarding, by the safety change control unit of the proxy robot controller, the request to the safety change control units of the other robot controllers, determining, in each safety change control unit, a response to the request, receiving, by the safety change control unit of at least one robot controller acting as a coherence investigating robot controller, the determined responses to the request from the safety change control units of the other robot controllers, investigating, in the safety change control unit of the coherence investigating robot controller, if the responses and the request match, and denying, by the safety change control unit of said coherence investigating robot controller, the request in case at least one response does not match the request.

2. The method according to claim 1, wherein each robot controller comprises a safety configuration and the determining of a response by each safety change control unit is based on an investigation of the corresponding safety configuration.

3. The method according to claim 2, wherein every robot controller is a coherence investigating robot controller, the method further includes distributing, by each safety change control unit, the determined response to the safety change control units of the other robot controllers, the investigating includes investigating in all safety change control units if the responses and the request match and the denying is performed if at least one of the safety change control units finds that at least one response does not match the request.

4. The method according to claim 2, wherein the investigating if the responses and the request match includes investigating if the responses are responses to the same request.

5. The method according to claim 2, further comprising implementing a protective stop for all of the manipulators if the request is denied.

6. The method according to claim 2, wherein the request corresponds to an operator manipulator selection of the at least one first joint and further including concluding, in each safety change control unit, that there is a match if no safety change control unit finds that at least one response does not match the request, and locking the operator manipulator selection.

7. The method according to claim 1, wherein every robot controller is a coherence investigating robot controller, the method further includes distributing, by each safety change control unit, the determined response to the safety change control units of the other robot controllers, the investigating includes investigating in all safety change control units if the responses and the request match and the denying is performed if at least one of the safety change control units finds that at least one response does not match the request.

8. The method according to claim 1, wherein the investigating if the responses and the request match includes investigating if the responses are responses to the same request.

9. The method according to claim 1, further comprising implementing a protective stop for all of the manipulators if the request is denied.

10. The method according to claim 1, wherein the request corresponds to an operator manipulator selection of the at least one first joint and further including concluding, in each safety change control unit, that there is a match if no safety change control unit finds that at least one response does not match the request, and locking the operator manipulator selection.

11. The method according to claim 10, wherein the request is received from a manual control configuration device and further including forwarding, by the safety change control unit of the proxy robot controller, information about the request and all responses to the manual control configuration device and confirming the validity of the locking if receiving an acknowledgment in return, wherein manual operation of the at least one first joint is allowed after the validity of the locking has been confirmed.

12. The method according to claim 10, wherein the locking is in effect until a request to cease manually operating said at least one joint is received by the safety change control unit of the proxy robot controller or the system is powered off.

13. The method according to claim 1, wherein the request is also a request to manually operate at least one second joint of at least one second manipulator via a second point of manual control at another one of the robot controllers.

14. A robot system comprising a first group of robot controllers, each robot controller including a safety change control unit and being connected to at least one corresponding manipulator, where one of the robot controllers is a proxy robot controller responsible for handling safety in relation to manual control of the manipulators, the safety change control unit of the proxy robot controller being configured to receive a request to manually operate at least one first joint of at least one first manipulator via a first point of manual control at one of the robot controllers, and forward the request to the safety change control units of the other robot controllers, each safety change control unit) being configured to determine a response to the request, and the safety change control unit of at least one robot controller acting as a coherence investigating robot controller being configured to receive the determined responses to the request from the safety change control units of the other robot controllers, investigate if the responses and request match and deny the request in case at least one response does not match the request.

15. The robot system according to claim 14, wherein all robot controllers are coherence investigating robot controllers, each safety change control unit is configured to distribute the determined response to the safety change control units of the other robot controllers, the investigating includes investigating in all safety change control units if the responses and the request match and the denying is performed if at least one of the safety change control units finds that at least one response does not match the request.

16. A proxy and coherence investigating robot controller for providing safety in a robot system, the robot system comprising a first group of robot controllers, each robot controller in the first group including a safety change control unit and being provided for connection to at least one corresponding manipulator, the proxy and coherence investigating robot controller being part of the first group of robot controllers, being responsible for handling safety in relation to manual control of the manipulators and comprising a safety change control unit configured to:

receive a request to manually operate at least one first joint of at least one first manipulator via a first point of manual control at one of the robot controllers, forward the request to the safety change control units of the other robot controllers, determine a response to the request, wherein the safety change control units of the other robot controllers also determine responses to the request, receive the determined responses to the request from the safety change control units of the other robot controllers, investigate if the responses and the request match, and deny the request in case at least one response does not match the request.

17. The proxy and coherence investigating robot controller according to claim 16, wherein the receiving of the request includes receiving the request from a manual control configuration device.

18. A non-transitory computer readable data carrier having stored thereon computer program code for providing safety in a robot system, the robot system including a first group of robot controllers, each robot controller including a safety change control unit and being provided for connection to at least one corresponding manipulator, the computer program code which when run by a processor of a proxy and coherence investigating robot controller in the first group of robot controllers, implements a safety change control unit configured to:

receive a request to manually operate at least one first joint of at least one first manipulator via a first point of manual control at one of the robot controllers, forward the request to the safety change control units of the other robot controllers, determine a response to the request, wherein the safety change control units of the other robot controllers also determine responses to the request, receive the determined responses to the request from the safety change control units of the other robot controllers, investigate if the responses and the request match, and deny the request in case at least one response does not match the request.

* * * * *